United States Patent [19]

Buckler

[11] 4,080,728
[45] Mar. 28, 1978

[54] METHOD OF MAKING FLAT BATTERY

[75] Inventor: Sheldon A. Buckler, Lincoln, Mass.

[73] Assignee: Polaroid Corporation, Cambridge, Mass.

[21] Appl. No.: 744,872

[22] Filed: Nov. 24, 1976

Related U.S. Application Data

[63] Continuation-in-part of Ser. No. 495,681, Aug. 8, 1974, abandoned.

[51] Int. Cl.² .......................................... H01M 10/04
[52] U.S. Cl. .................................. 29/623.4; 29/623.5; 429/162
[58] Field of Search ................ 29/623.1, 623.4, 623.5; 429/152, 153, 154, 162

[56] References Cited

U.S. PATENT DOCUMENTS

| | | | |
|---|---|---|---|
| 2,663,750 | 12/1953 | Paillet | 429/162 X |
| 2,684,989 | 7/1954 | Wilburn | 429/162 X |
| 2,844,641 | 7/1958 | Lang et al. | 29/623.3 |
| 3,563,805 | 2/1971 | Deierhoi, Jr. | 429/162 X |
| 3,907,599 | 9/1975 | Fanciullo et al. | 429/162 X |

*Primary Examiner*—Carl E. Hall
*Attorney, Agent, or Firm*—John W. Ericson

[57] ABSTRACT

A method of making thin flat laminar batteries in which subassemblies are made by sealing conductive intercell connectors to the inner peripheries of frames of nonconducting material and wet electrodes are applied on either side of the intercell connectors. A separator is placed over one of the wet electrodes. A series array of these subassemblies are sealed together about the outer peripheries of the frames, with electrodes of opposite polarity in adjacent subassemblies in contact with the separator. End cells are completed by frames sealed on one side to terminal collector sheets and on the other side to external surfaces of the series array.

11 Claims, 15 Drawing Figures

METHOD OF MAKING FLAT BATTERY

This application is a continuation-in-part of my copending U.S. application Ser. No. 495,681, filed on Aug. 8, 1974 for Flat Battery and assigned to the assignee of this application, now abandoned.

This invention relates to electrical cells and batteries, and particularly to a novel cell and battery construction especially suited to very high current drain applications.

An automatic photographic system currently in widespread use comprises the Polaroid Sx-70 Land Camera, equipped to expose and process film units provided in cassettes of ten. All power for this system is supplied by a thin, flat, disposable battery in each cassette.

The requirements of a disposable battery suitable for use in an automatic photographic system such as the Polaroid SX-70 Land system are onerous. In order to operate the camera and eject and process the film units, relatively high current drain capability as well as adequate capacity are needed in a package that is both highly compact and sufficiently inexpensive to justify its disposal after the film units with which it is packaged have been exposed and processed.

Still more ambitious goals have been proposed for automatic photographic systems powered by compact, disposable batteries. In U.S. Pat. No. 3,846,812, issued on Nov. 5, 1974 to Conrad H. Biber for Automatic Electronic Flash Camera, the desirability of obtaining the power for an electronic flash unit, as well as for the camera, from the battery in the Polaroid SX-70 film pack is expressed, and circuits are described for dividing the operating cycle of the camera in such a way as to minimize the requirements on the battery. Assuming a flash unit of relatively modest output for the SX-70 format, and typical recharge times of ten to twenty seconds, it is thus possible to use the battery currently sold in the SX-70 film pack even for this considerably more demanding purpose. The ability to use a more powerful flash unit, while obtaining shorter recharge times, would obviously be welcomed. However, the current production battery is not capable of the greatly increased requirements of power and current density that such an extension would imply.

It would obviously be a simple matter to increase the capabilities of the system by considerably increasing the size of the battery, or by using a plurality of batteries. Neither expedient would be compatible with the concept of a compact and self-contained system, in which the battery makes negligible contribution to the size of the film pack, being for the most part disposed in unused space under the film advance spring.

The current production battery is disposed on a card about 3.5 by 4.2 inches, has external dimensions of about 2.75 by 3.42 by 0.125 inches, and has an active electrode area of about 4.7 square inches. It is possible to increase the electrode area by about twenty five percent without changing the external dimensions, effecting a significant improvement in capacity and in internal impedance. The capacity of the battery can also be increased by doubling the weight of the cathodes, at the cost of about 0.025 inches in thickness, an amount that is within the limit that the film pack will accept. In this manner, the capabilities of the battery can be increased sufficiently so that a forty watt second flash unit cound be used with the camera for a full cycle of ten exposures. But the results would still leave something to be desired, in the two central respects of cost and performance.

The battery currently sold with the SX-70 film pack employs a so-called "dry patch" construction for both anodes and cathodes. There are formed by depositing slurries of particulate material, comprising zinc powder and a little carbon for the anode, and manganese dioxide with more carbon for the cathode, in aqueous systems including dispersing agents and binders. After deposition on the conductive plastic substrates used as current collectors and intercell connectors, these slurries are dried to form adherent patches. During the assembly of the battery, these dry patches are coated with gel electrolyte, whereby the anodes and cathodes are brought into electrochemical communication through the separators. This process is undesirably complex. Moreover, the binders used to hold the patches together contribute significantly to the internal impedance of the battery. The result is that when the cathode patches are increased in thickness enough to provide the capacity to handle a forty watt second flash unit in the SX-70 system, recharge times are undesirably long.

The objects of this invention are to increase the current drain capabilities of thin, laminar batteries, without a substantial increase in size, while simplifying the manufacture and thereby increasing the yields and decreasing the cost of such batteries.

Briefly, the above and other objects of the invention are attained by a novel battery construction in which the cathodes are deposited, by extrusion, for example, as slurries containing from about twenty three to about thirty percent of water, and preferably from twenty six to twenty eight percent of water, based on the weight of slurry. Where optimum performance measured by short flash unit recharge times is the first objective, it is preferred to make the anodes in conventional dry patch form. However, where manufacturing simplicity and cost are first in order of priority, assuming that good flash charging capability can also be achieved, it is preferred to make the anodes in the form of slurries containing from twenty-five to forty percent, and preferably about twenty-six to thirty-six percent, of water based on the weight of anode slurry. In this manner, the steps of drying and gel coating can be eliminated, and the addition of high impedance binders can be avoided.

Surprisingly, the absence of adhesives and binding agents in the slurries does not adversely affect the internal impedance of the batteries, as indications in the literature would lead one to expect, but quite the reverse. In particular, U.S. Pat. No. 3,617,387, issued on No.v 2, 1971 to Carl Albert Grulke and Thomas Arthur Reilly for Battery Construction Having Cell Components Completely Internally Bonded With Adhesive proclaims the necessity for adhesive bonds in batteries for which no external compressive stress mechanism is provided. Also, in U.S. Pat. No. 2,870,235, issued on Jan. 20, 1959 to D. G. Soltis for Cathodic Envelope Cell, where wet mixes for both cathode and anode are described without any mention of binders, the elements are sealed in moisture proof envelopes and are packaged as to make possible the application and maintenance of "very heavy end-wise pressure on a stack of cells"; e.g., about 136 pounds per square inch. It has been found that when the necessary critical limits on water content in the slurries is observed, these being different for the anode and the cathode as noted, the deposition of the slurries is greatly facilitated, the leakage problems mentioned in the above-cited Soltis patent are avoided, and very low internal impedances and long shelf life can be attained without the application of external compressive stresses.

Batteries comprising both positive and negative slurry electrodes in accordance with the invention are preferably made by a novel process involving the manufacture of three basic sub-assemblies. The first of these comprises a sheet metal terminal to which is bonded a thin conductive plastic current collector. To this laminate is bonded a frame having a central opening exposing the conductive plastic over a region defining an electrode site. A positive or negative slurry electrode in accordance with the invention is extruded into this opening to form a terminal electrode assembly for the battery. The slurry deposit so made is then covered with a separator.

A series of second sub-assemblies comprises an intercell connector made from a thin sheet of conductive plastic. This intercell connector is sealed over the central opening in a frame such as that first mentioned, the borders of which extend beyond the boundaries of the intercell connector. Another deposit of slurry electrode of the first kind is extruded into the opening in the frame over the intercell connector. A separator is placed over this slurry deposit. On the opposite side of the assembly thus formed, a slurry deposit of a second kind, opposite in polarity to the electrodes of the first kind, is made by silk screening, extrusion or the like.

A third sub-assembly is made comprising an electrical terminal made from a sheet of thin metal to which there is bonded a current collector of conductive plastic such as that described above. On this laminate there is extruded a slurry deposit of the second kind mentioned above.

Sub-assemblies of the second kind are stacked in series and on the first sub-assembly described above, whereupon the third sub-assembly is added to the stack. The composite assembly so formed is then sealed around the edges to make a completed battery. By this process, thin, flat laminar batteries can be made with considerably fewer steps than in production processes practiced prior to the invention.

The manner in which cells and batteries are constructed in accordance with the invention, and considerations governing the choice of materials and proportions, will best be understood in the light of the following detailed description, together with the accompanying drawings, of various illustrative embodiments of the invention.

Figure 5:
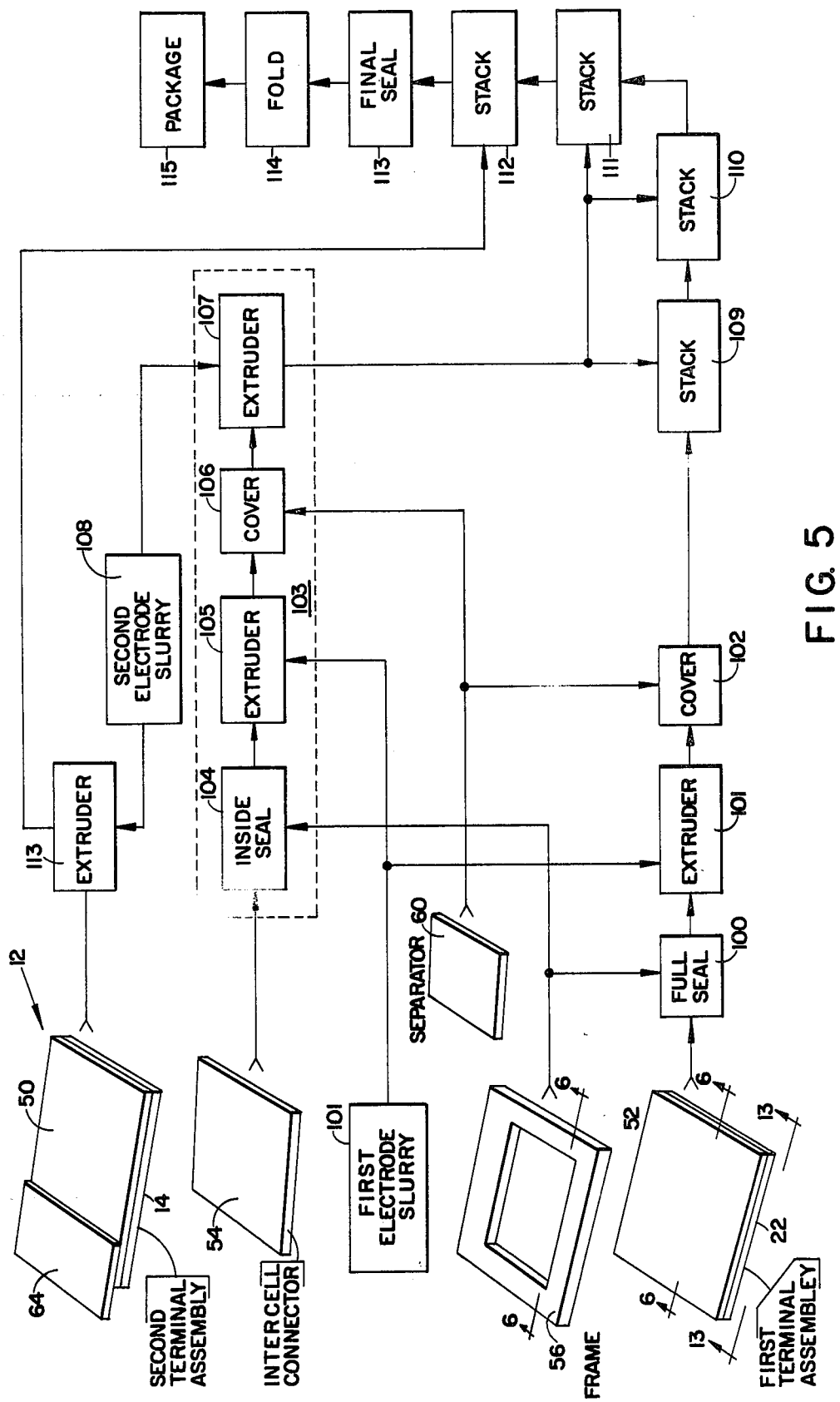
FIG. 5 is a schematic block and flow diagram illustrating components and processes schematically drawn to show the manner in which thin, flat laminar batteries are made in accordance with the invention.
Figure 15:
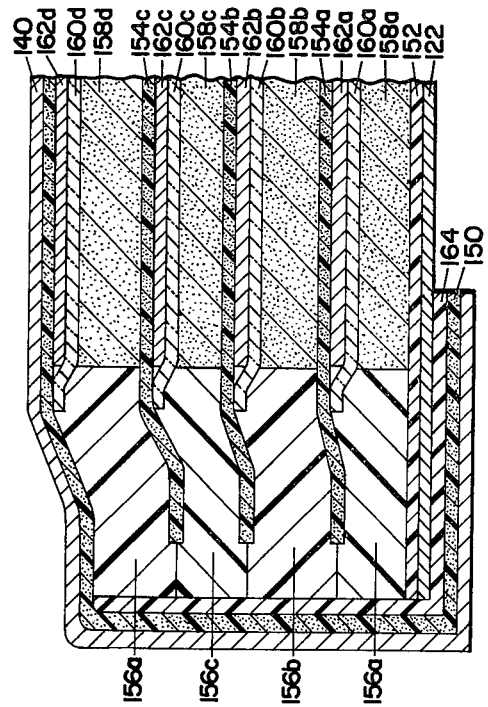
Figure 13:
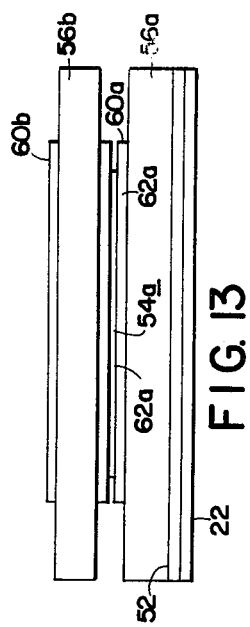
Figure 14:
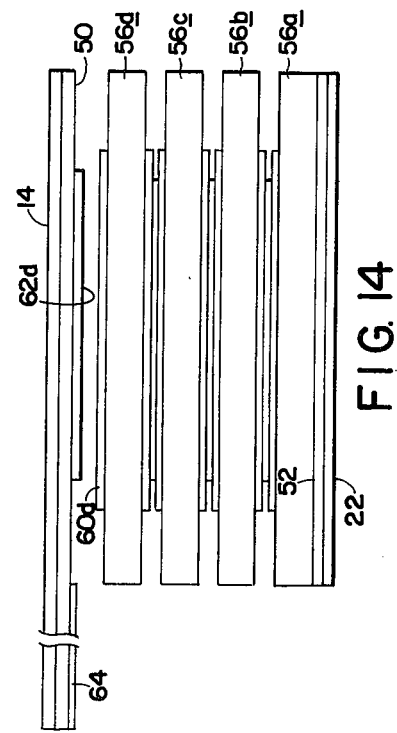

FIG. 13 and 14 comprise schematic elevational sketches, taken essentially along lines such as 13—13 in FIG. 5, illustrating two stages in the process of manufacturing batteries in accordance with the invention; and FIG. 15 is a schematic fragmentary cross-sectional elevational sketch, on an enlarged scale, illustrating a portion of a completed battery made in accordance with a modification of the invention.

Figure 1:
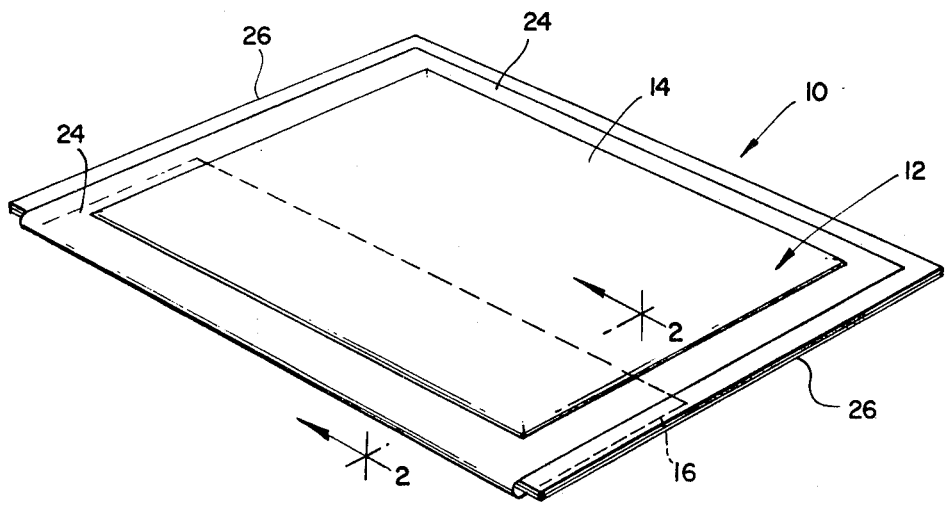
FIG. 1 is a perspective view of a flat primary battery structure according to the invention.

A multicell flat battery structure is presented generally at 10 in FIG. 1 as it would appear in an electrochemically active state following component build-up and prior to final packaging. Features of the battery structure apparent from this perspective view include an upwardly disposed anode current collector assembly 12, the outwardly facing surface 14 of which is fashioned of a metal to serve as a terminal. Current collector assembly 12 is folded about one side of battery structure 10 such that the terminal defining portion 16 of surface 14, as revealed in FIG. 2 and in phantom in FIG. 1, is located on the lower side of the battery. A cathode electrode collector assembly 20 (shown in FIGS. 2 and 3) is provided as the lowermost component of the battery and includes, in similar fashion as assembly 12, a metallic outwardly facing surface portion 22 which also serves as a terminal surface for the battery structure. With the geometry shown, cathode and anode terminals may be provided in convenient adjacency on one side of the pile assembly. The slightly depressed peripheral portion 24 of the assembly is occasioned from peripheral sealing procedures providing during assembly. This depression, as revealed in FIG. 2, necessarily becomes more exaggerated in a sectional view of the battery. Extending from the periphery of the battery and formed in the course of the sealing procedures, is an outer border seal 26 formed of a plurality of frame-type sealing elements which extend inwardly from the border portion shown to select laminar elements of the battery. This lamination, as at 26, is relatively rigid, thereby contributing to the structural integrity of the flat battery configuration.

Figure 2:
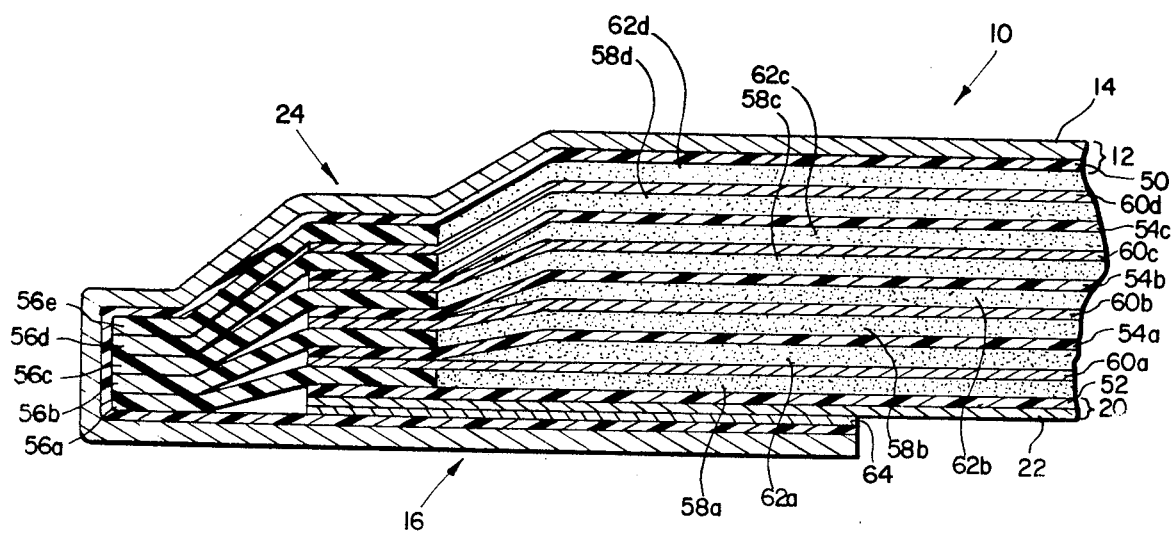
FIG. 2 is a sectional view of a battery structure according to the invention taken through the plane 2—2 of FIG. 1.
Figure 3:
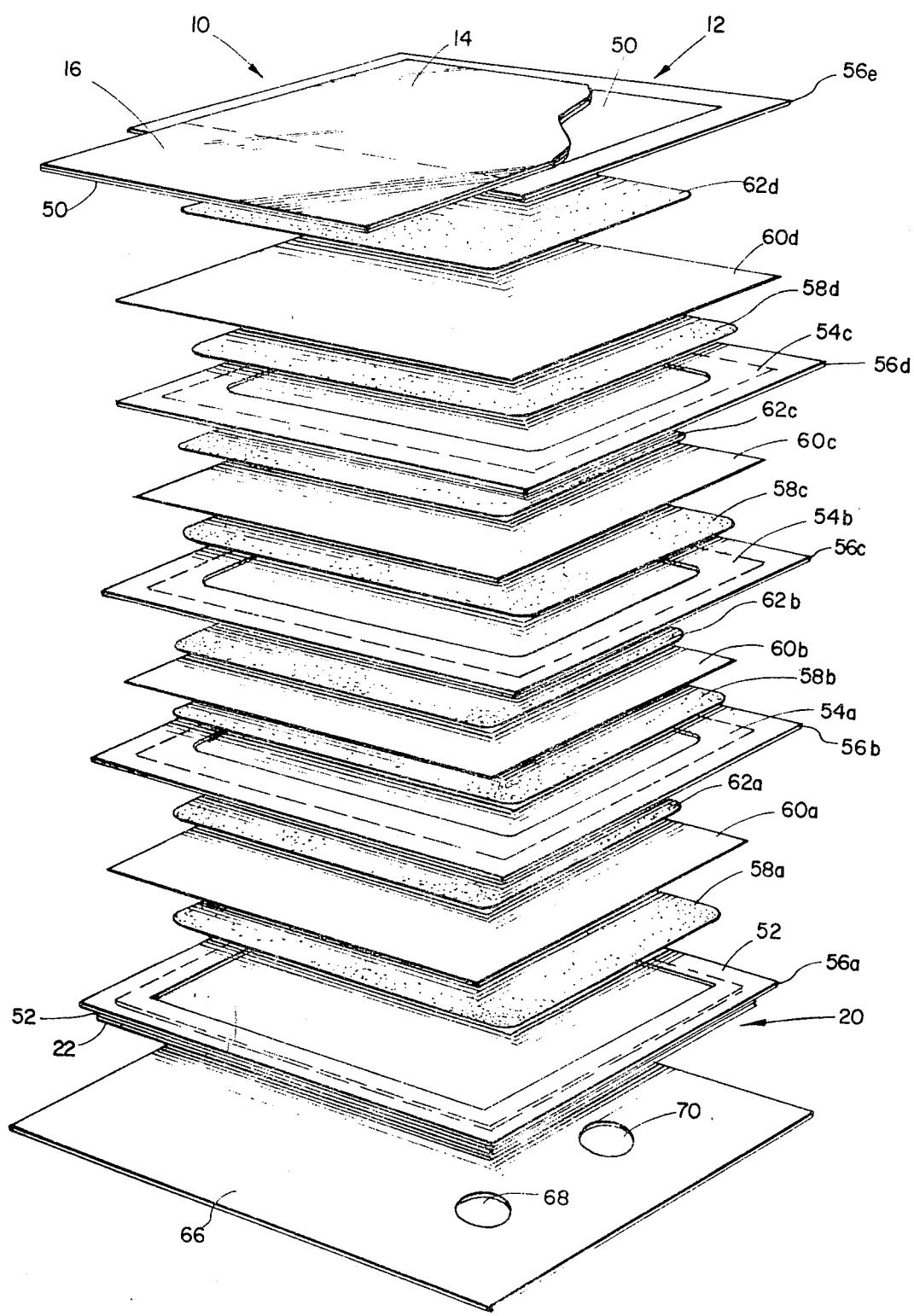
FIG. 3 is an exploded perspective representation of the components of a battery structure according to the invention, revealing the relative orientation of sheet-type components thereof.
Figure 4:
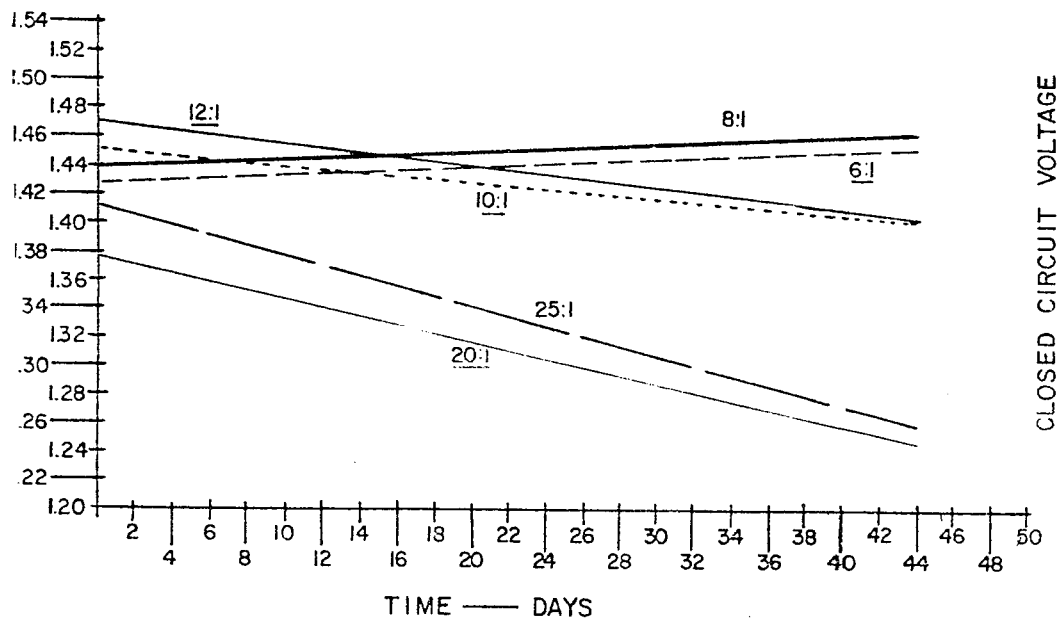
FIG. 4 is a chart comprising a family of curves showing the shelf life characteristics of single primary cells with slurry cathodes of varying manganese dioxide to carbon ratios.

Referring to FIGS. 2 and 3, the geometry and interrelationships of the discrete components forming battery pile 10 are revealed in detail. As described above, the exposed surfaces of the battery are present as an outer laminate of current collector assemblies 12 and 20. Prefabricated as discrete elements of the system, assemblies 12 and 20 are formed of a metallic sheet foil current collector which, in turn, is laminated to an internally disposed polymeric current collector. In this regard, assembly 12 is formed having a metallic surface current collector 14 serving as a terminal surface laminated with a polymeric current collector 50, while assembly 20 is formed having a metallic current collector outer terminal defining surface 22 laminated with polymeric current collector 52. Each of the metal current collectors 14 and 22 may be provided as an annealed tin coated steel sheet, preferably about 2 mils in thickness;

however, they also may be formed of aluminum or lead sheet material of similar thickness for batteries intended for electronic photographic use. Polymeric current collectors 50 and 52 may comprise a non-conductive matrix, for instance, of a thermoplastic material so thoroughly impregnated with conductive particles, as of carbon, for example as to be effectively conductive. For example, the polymeric layers of the battery may be made from an electrically conductive carbon-impregnated vinyl film sold under the trademark "Condulon" having a thickness on the order of about 2 mils. for the instant application. As is apparent, the assemblies are prelaminated together prior to their assembly within the battery pile. Collector sheets 50 and 52 generally are impervious to electrolyte, are electrochemically inert and are characterized in exhibiting a low resistance to the flow of current from one face to the opposite face thereof. Accordingly, discrete sheets of this same material may be utilized for geometric cell definition and additionally as intercell connectors within a series build-up of cells forming a primary battery pile structure.

Considering the build-up of the pile structure, the battery 10 is seen to be formed for four serially associated cell units which are electrically associated but chemically isolated by intercell connectors 54a–54c. The intercell connectors preferably are formed as discrete rectangular sheets of electrically conductive carbon-impregnated vinyl film, as described earlier in connection with collector sheets 50 and 52, and, for the instant application having a thickness on the order of about 2 mils. The peripheral integrity of the entire pile structure is provided by a sequence of frame-shaped border seals designated generally at 56a–56e. Being mutually identically dimensioned, frames 56a–56e are formed having inner borders which define rectangular inner openings which mutually cooperate to form the peripheries of individual cell cavities. Additionally, each of the frames is dimensioned such that it extends beyond the periphery of an associated polymeric intercell connector 54a–54c as well as the polymeric surface portion 52 of assembly 20. As revealed in FIG. 3, the frame 56e extends outwardly from three edges of the assembly 12. As noted from the drawings, the frames 56a–56e are continuous and preferably are formed of a material heat sealable both along their commonly juxtaposed surfaces in the final pile structure as well as with polymeric collector sheets 50, 52 and 54a–54c. Material for the frames should be electrolyte impervious, remaining inert to the chemical activity of the battery structure. The frames 56a–56e may be formed of polyvinyl chloride having a thickness, for the present application, of about five mils. The thermal sealing of the inner border surface areas to a corresponding polymeric sheet, for instance, as at 52, may be carried out in impulse fashion wherein the temperature of the sealed portion is raised from room temperature to about 275° F. and returned to room temperature over an interval of about 15 seconds.

To form an initial one of the pile cell structures, an initial collector assembly, for instance, cathode collector assembly 20, may be preformed as a discrete assembly and a frame member 56a may be bonded thereto as described above. Over this subassembly is deposited, preferably by extrusion, a positive aqueous slurry which is present as a particulate dispersion of cathodic mix particles uniformly dispersed, preferably in combination with a dispersing agent, with aqueous electrolyte. In the preferred embodiment, the battery 10 incorporates a Leclanche electrochemical system, accordingly, the cathodic material will be present as a particulate dispersion of manganese dioxide and carbon dispersed within an aqueous ammonium chloride, zinc chloride and, additionally, a small amount of mercuric chloride. The dispersant for the slurry is one selected to maintain a homogeneous character for the dispersion therewithin and will exhibit a high tolerance for salt as well as a stability from such effects as syneresis or the like. A particularly desirable characteristic for the dispersant is one which renders the slurry thixotropic, thereby considerably facilitating extrusion type deposition procedures.

Dispersants which may be incorporated within the slurries may be categorized as polymeric, synthetic resins or natural gums, included in amounts, generally less than one percent by weight of the electrolyte, selected to enhance cohesiveness and extrudability without substantially degrading the electrical properties of the slurry. In effect, the dispersion provides for adequate interparticulate contact to assure electrical conductivity while, at the same time, providing a maximum exposure of particulate surface area to ion conduction as derived from the electrolyte component of the slurry. As examples of polymeric dispersing agents effective for the development of the slurries of the invention, mention may be made of methylcellulose (sold under the tradename "Methocel 4000" by Dow Chemical Co., Midland Mich.), poly-ethylene oxide (sold under the tradename "Polyox" by Union Carbide Corp., N.Y., N.Y., hydroxyethyl cellulose (sold under the tradename "Klucel" by Hercules Inc., Wilmington, Del.) heteropolysaccharide (anionic) (sold under the tradename "Xanthan Gum" by General Mills Corp., Minneapolis, Minn.), and poly-2-acrylamido-2-methylpropane sulfonic acid. A natural gum dispersing agent which may be utilized with the slurry system of the invention may be, for example, guar gum derivative (sold under the tradename "Jaguar" by Stein, Hall & Co., N.Y., N.Y.).

The essential characteristic of cathode slurries in accordance with the invention is the inclusion of not more than about 30 percent, nor less than about 23 percent, of water, based on the weight of slurry. Preferably, the water content is from 26 to 28 percent by weight. Smaller amounts of water produce a mix that cannot be easily or uniformly extruded, does not form a cohesive layer in the battery, and generally lead to low yields and poor shelf life and performance. About 30 percent by weight of water is the most that can be included before separation of the liquid from the slurry is encountered, causing leakage and poor seals which greatly reduce both yields and the shelf lives of the survivors. The conditions in this regard are much different from those encountered in flat Leclanche cells designed for operation under pressure, as in the above cited Soltis patent; in cylindrical Leclanche or alkaline cells, which again are basically pressurized systems; in cells designed for operation at very low temperatures; or in zinc chloride cells.

In *Batteries, Volume I, Manganese Dioxide*, edited by Karl V. Kordesch and published by Marcel Dekker, Inc., New York, N. Y. in 1974, on page 155, various cathode mix compositions for various current drain conditions in cylindrical D cells are given. These range in water content from about 10 to about 16 percent, based on the weight of mix. Alkaline cells are discussed in chapter 2 of the same book; since the chemistry is quite different, notably in that alkaline cells are anode dependent, whereas Laclanche cells are cathode dependent; and in that Leclanche cells are acidic in pH, whereas the alkaline cells have a very high pH; analogies cannot readily be made. Very low temperature cells are described, for example, in U.S. Pat. No. 3,060,256, issued on Oct. 23, 1962 to J. W. Paulson for Low Temperature Dry Cell. In this patent, the inclusion of lithium chloride in the electrolyte, together with a moisture content as high as 36 percent by weight, are recommended. Such a formulation could not be used for the purpose of this invention, because of the separation and leakage problems described above. Zinc chloride cells are described in the above cited boo, *Batteries*, on pages 213–215 and elsewhere, and a particular example containing 25.6 percent of water in the cathode mix is described in U.S. Pat. No. 3,888,699, issued on June 10, 1975 to Lewis F. Urry for Primary Dry Cell. These cells are not analogous to Leclanche cells, particularly where water content is concerned, because the chemistry is quite different. In particular, as set out on pages 214 and 215 of *Batteries*, supra, in the zinc chloride cell 9 moles of water are consumed for each 8 moles of $MnO_2$ reduced, whereas there is no water loss in the overall reaction of the Leclanche cell. Moreover, the high impedance of zinc chloride solutons would make their use utterly impractical where very high current drains are needed.

The deposited positive aqueous slurries are represented in the drawings at 58a–58d. Note that the slurry as at 58a is deposited over the surface of polymeric collector 52 and corresponding cathodic slurries 58b–58d are located for contact with an upwardly extending surface of an appropriate intercell connector sheet 54a–54c. With this arrangement, the contacting polymeric surface serves as a current collector for the associated positive electrode structure.

It has been determined that for slurry cathode electrode systems according to the invention, the ratio by weight of manganese dioxide to carbon within the slurry may be optimized. The curves of FIG. 5 provide an indication of shelf life versus closed circuit voltage performance of cathode slurry unit cells formed having varying ratios of manganese dioxide to carbon content. Each curve is labeled with that ratio with which the unit cells deriving it were fabricated. For some structures, significantly improved shelf life performance may be achieved with ratios between about 6:1 and 12:1. However, within this range, the most preferred ratio for achieving improved shelf life for the cells is 8:1.

Upon deposition, as by extrusion, of cathodic slurry 58a, a selectively dimensioned sheet of battery separator material 60a is positioned thereover. This material is selected as being wettable by the slurry depositions with which it is in contact as well as being ionically permeable. Additionally, the material should exhibit a texture or porocity, the intersititial openings or channels of which are of adequately fine geometry or size to assure that no migration of the particulate matter of the slurries from one electrode environment to another may occur. Among the materials conventionally used as separators, mention may be made of fibers and cellulosic materials, woven or nonwoven fibrous material such as polyester, nylon, polypropylene, polyethylene or glass. Specifically, a Kraft paper having a thickness of about 2.0 mils. has been found to be adequate for the purpose of the instant application. However, the best material for this purpose presently appears to be cellophane free of humectants or plasticizers, as described in more detail in U.S. application for Pat. Ser. No. 684,370, filed on May 7, 1976 by Edwin H. Land for Electrical Cells and Batteries and assigned to the assignee of this application.

As shown in FIGS. 2 and 3, separator 60a as well as separators 60b–60d are dimensioned as having the same peripheral shape and size as polymeric collector 20 or intercell connectors 54a–54c. In this regard, note that the separators are dimensioned such that their peripheries extend over the inner rectangular openings defined by the inner borders of frames 56a–56e.

The associated anode for the initial cell of the pile structure illustrated is represented by a slurry deposited over one surface of intercell connector 54a opposite and generally coextensive with the deposition of cathodic slurry 58a. As in the case of the cathode slurries, the anode slurry as at 62a may be deposited utilizing positive displacement techniques, doctoring, silk screening or the like, however, considerable manufacturing advantage may be achieved inasmuch as the slurry is of a consistency permitting its deposition by extrusion.

Negative electrode slurries 62a–62d comprise a particulate dispersion of metallic anode particles disposed as in the case of the positive slurry, as a substantially uniform dispersion within aqueous electrolyte. For a Leclanche system, zinc particles are utilized as the active material and are present in a concentration per unit area effective to provide an electrically conductive dispersion thereof, while the electrolyte is present in intimate surface contact with the particles in a concentration rendering the slurry ionically conductive. A zinc particle size of, for example, about eight microns mean diameter may be utilized with the slurry. The dispersing agent utilized for the slurry may be selected to enhance deposition thereof. Those dispersing agents described above in connection with the formation of the positive slurry electrode may be utilized for forming the negative slurry electrode.

The essential characteristic extrudability and coherance of anode slurries in accordance with the invention are dependent on the amount of water included in the mix. When the object is to form a smooth adherent layer on a conductive plastic substrate by extrusion, silk screening or the like, while achieving minimum impedance, conventional techniques used in forming powdered zinc electrodes are not satisfactory. It is highly undesirable for this purpose to form the electrode with substantial proportions of a gelling agent, as has been done in alkaline cells, for example, because the impedance would be too high. Methods based on placing the zinc powder in a pouch or envelope, as in the above cited patent to Soltis, are inapplicable because no mechanism is available in the laminar battery to hold the powder in place during assembly. In slurries formed with solutions of Leclanche electrolytes, zinc tends either to cake up and form a crumbly mass that is not adherent to the substrate, or to separate out of the liquid. A small amount of a water soluble polymeric suspending agent, such as caboxymethyl cellulose, hydroxyethyl cellulose or the like, is of material assistance in keeping the zinc powder in suspension. On the other hand, the zinc and ammonium chlorides appear to act in opposition to the suspending agent in this respect. It has been found that with an electrolyte solution of typical low impedance concentrations of zinc chloride and ammonium chloride, in which ammonium chloride predominates, somewhat larger quantities of liquid, and consequently of water, may be needed than in the cathode slurries. In particular, amounts of from 25 to 40 percent of water, and preferably about 26 to 33 percent, of water, based on the weight of anode slurry, produce mixes of good extrudability and reasonable stability. All such slurries should be used soon after they are prepared; standing overnight, for example, will usually produce settling, caking or gassing.

The first cell build-up is completed with the positioning in registry of intercell connector 54a over negative slurry deposition 62a. Intercell connector 54a is formed, as described above, incorporating a border sealing frame 56b, the inner surface portion of which is thermally bonded to the outwardly disposed surface of the intercell connector sheet. Upon being so positioned to define the cell, the outer peripheral border surface portions of frame 56b are thermally bonded with the corresponding outer surface portion of frame 56a. In addition to serving as an intercell connector, sheet 54a also serves as the current collector for the negative electrode of the initial cell. Note that within the initial cell, separator 60a extends not only sufficiently to separate the electrode slurries 58a and 62a but also is configured to provide electrical separation of current collector sheets 52 and 54a and to extend over the thermal bonding surface between each frame member and its associated current collector sheet. With this arrangement, no inadvertent shorting effects or the like are likely to arise. Further, such geometry assures that no migration of the particulate dispersion of one electrode slurry into the opposite electrode slurry occurs.

For production of a battery unit having a single cell construction, cathode slurry material 58a is deposited on current collector assembly 20 as described above. Separator sheet 60a then is positioned over the slurry following which anode slurry material is deposited upon the surface of polymeric current collector 50 of current collector assembly 12. Border frames 56a and 56e then are heat sealed together to complete the cell. This sealing may be carried out by the above-noted impulse thermal bonding technique.

To provide the multicellular pile structure, for instance, having four cells as illustrated in the drawings, the pile build-up is carried out in a sequence next to be described. In particular, the initial cell is fabricated as above by depositing cathode slurry 58a following which separator 60a is positioned over in appropriate registry with polymeric collector 52. Anode slurry material 62a then is deposited upon one surface of intercell connector 54a and the connector 54a as well as previously attached frame 56b is joined with collector assembly 20 and thermally bonded thereto at the adjoining surfaces of frames 56a and 56b. Cathode slurry material as at 58b then is deposited on one side of a next separator sheet 60b and the subassembly is placed in appropriate registry upon the opposite side of polymeric intercell connector 54a. Anode slurry composition then is deposited upon one side of another polymeric intercell connector 54b. Intercell connector 54b, including previously attached frame 56c then is placed over the subassembly including separator 60b following which frame 56c is thermally bonded with frame 56b. This procedure essentially is reiterated until the entire pile structure including anode current collector assembly 12 is attached. Following desired final thermal bonding of the entire stacked array of cells, extended portion 16 of collector assembly 12 is covered with an insulative tape 64 and wrapped around to the underside of the battery to provide for juxtaposed terminal defining surfaces. The battery assembly may then be mounted upon a supporting card as at 66 having apertures 68 and 70 preformed therein to provide access to the noted terminal defining surfaces.

The process of the invention just described will next be more fully described with reference to FIGS. 5 through 14. FIG. 5 shows in a schematic fashion the several components of the battery described above in their relation to a manufacturing and assembly process in accordance with the invention illustrated in block diagram form.

The process may be considered as divided into three sub-processes, each of which results in the manufacture of a subassembly, which subassemblies are then assembled to make the completed battery. As indicated above, the first subassembly comprises as starting material, the metal terminal 22 to which is laminated the conductive plastic current collector sheet 52.

Figure 6:
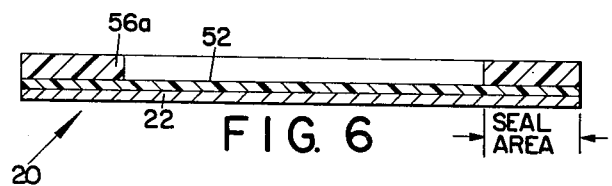
FIG. 6, 7 and 8 are a series of schematic cross-sectional elevational sketches, taken essentially along the lines such as 6—6 in FIG. 5 but on an enlarged scale, illustrating sequential steps in process of making a first sub-assembly in accordance with the invention.

As illustrated in FIGS. 5 and 6, the first terminal assembly comprising the sheets 22 and 52 are bonded to a first frame 56a of a series of the frames 56 described above in a sealing station indicated schematically at 100 in FIG. 5, so that the conductive plastic sheet 52 is bonded to the whole surface of the frame 56a over the area indicated schematically in FIG. 6.

Figure 7:
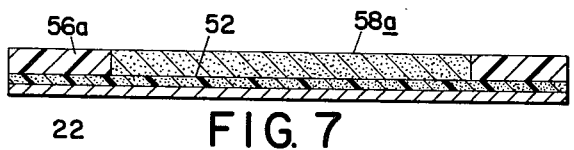

A supply of the first electrode slurry, comprising the material for making up the cathode slurries 58 in the particular embodiment here described, is schematically indicated as disposed in a container 101 for distribution to various extruders to be described, including in particular a first extruder 101. At the extruder station 101, the first cathode slurry deposit 58a is deposited within the opening in the frame 56a and over the surface of the conductive plastic collector sheet 52 as shown in FIG. 7. The extruder 101, and other such devices to be described, amy be any conventional apparatus known in the art for this purpose. In a hand process, the slurry could simply be deposited with a spatula using the frame 56 as a mask.

Figure 8:
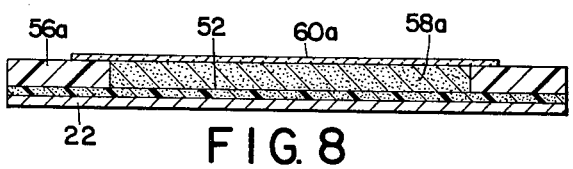

The subassembly illustrated in FIG. 7 produced at the extruder 101 is next transfered to a station at which the first of the separators 60, and particularly separator 60a is placed over the frame 56a and in contact with the slurry patch 58a as shown in FIG. 8. The structure of FIG. 8 comprises the first subassembly discussed above.

Figure 9:
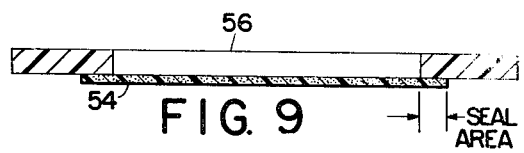
FIG. 9, 10, 11 and 12 are schematic cross-sectional elevational sketches, again taken along lines such as 6—6 in FIG. 5 and illustrating steps in the process of making a second series of sub-assemblies in accordance with the invention.

The manufacture of a second series of subassemblies is carried out in process apparatus indicated generally at 103 in FIG. 5. At a first station 104 in the apparatus 103, one of the intercell connectors 54 is sealed to one of the frames 56 over a portion of the inner periphery of the frame 56 as shown in FIG. 9. This process is carried out by the application of heat and pressure in a conventional fashion either by any conventional automatic processing apparatus or by hand, with the aid of a suitable manually operated heated press.

Figure 10:

Comparing FIGS. 5, 9 and 10, the framed intercell connector 54 of FIG. 9 is transfered from the sealing apparatus 104 to an extruder 105 of any variety described above, in which a slurry deposit from the first slurry electrode supply 101 is deposited as indicated at 58 in FIG. 10. As suggested at 106 in FIG. 5, this assembly is then covered with one of the separators 60 to produce the subassembly shown in FIG. 11. The separator 60 will become wet by the slurry 58 when this operation is performed, assisting it in adhering to the cathode slurry 58. If the separators 60 are made of a conventional porous material, having their edges filled with liquid impermeable, thermoplastic adhesive material, as described, for example, in U.S. Pat. No. 3,708,349, issued on Jan. 2, 1973 to William R. McCauley et al, for Method of Constructing Multicell Batteries, the separator 60 may be sealed under heat and pressure to the frames 56 at this stage. This operation is actually not essential, however, because the peripheral seal is entirely completed through the frames 56.

Figure 11:
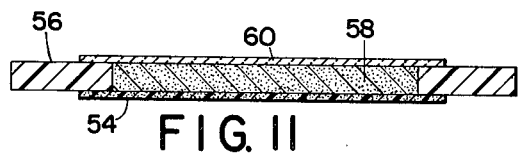
Figure 12:
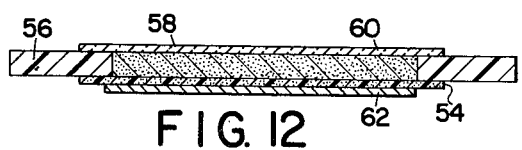

Referring now to FIGS. 5 and 11, as the next stage in the operation, the assembly from the covering stage 106 is transmitted to an extruder 107 of the kind described above, where a slurry anode deposit 62 shown in FIG. 12, is applied from a supply of a second electrode slurry 108 indicated in FIG. 5. This operation completes the second subassembly, of which three are required for a four cell battery.

It will be apparent that because the apparatus 103 is required to produce three subassemblies for each subassembly produced from the cover stage 102, for high speed production as many lines 103 would be desirable as there were subassemblies of the second kind to be made. In particular, for four cell battery, three such lines 103 would be desirable. However, this feature has not been illustrated as it would sufficiently be apparent from the description given and would unduly complicate the drawings.

Comparing FIGS. 5, 8, 12 and 13 as the next step in the process of assembly, one of the subassemblies of FIG. 12 from the extruder 107 is stacked on top of the subassembly of FIG. 8 from the cover operation 102 at a station indicated schematically at 109 in FIG. 5. The result is as shown in FIG. 13. This operation simply comprises placing frames 56a and 56b in registry and bringing the components together.

This stacking operation is reiterated, as suggested at 110, 111, and 112 in FIG. 5, until each of the three subassemblies comprising the frames 56b, 56c, and 56d are in place as illustrated in FIG. 14.

Manufacture of the third subassembly begins with the second terminal assembly 12 described above. As illustrated in FIG. 5, the plastic insulator sheet 64 may be heat sealed to the conductive plastic sheet 50 as a preliminary step, or may be added later as described above.

The second terminal assembly 12 is provided with a second anode slurry patch 62d from the supply of second electrode slurry material 108 in an extruder 113 to produce a subassembly shown in FIG. 14 that is stacked with the other components of the battery as suggested at 112 in FIG. 5 and shown partly completed in FIG. 14. The assembled stack is then passed to a final seal operation as indicated at 113 at which the seals are completed around the entire periphery of the battery as described above.

As suggested at 114, the anode terminal may be folded over to bring the insulating sheet 64 into the position shown in FIG. 2, and the final packaging can be completed as suggested at 115 in FIG. 5 and described in more detail above.

FIG. 15 shows a portion of a completed battery in accordance with the modification of the invention particularly adapted for use with cellophane separators. The process of FIGS. 5 through 14 may be employed to produce this battery, the primary difference being in the relative sizes of the separators and the intercell connectors.

In FIG. 15, parts are given reference characters corresponding to parts with similar function in FIG. 2, with 100 added to the suffix. For example, the frames are numbered 156a through 156d, rather than 56a through 56d. One exception to the numbering scheme just mentioned is that the outer terminal steel 140 corresponds to the terminal 14 in FIG. 2.

One presently preferred material for the frames 156a through 156d is Versalon TPX 1140, a polyamide resin made by General Mills Corp. of Minneapolis Minn. These frames may be 18 mils thick in a particular embodiment of the invention, designed to incorporate relatively thick cathode slurry layers 158a through 158d.

The separators 160a through 160d in FIG. 15 are made smaller than the intercell connectors 154a through 154c. When the separators 160 are made of cellophane, this construction is preferred because the cellophane becomes wet by the slurry and is not readily bonded to the other elements in the battery. Thus, the intercell connectors 154 are carried out beyond the separators so that they can participate in the seal formed between the frames 156. In this manner, the integrity of the seal may be considerably improved.

Various modifications may be made in the process in FIG. 5 without departing from the scope of the invention. In particular, the first anode slurry at 101 has been described as the cathode slurry because a Leclanche system in the cathode slurry will generally be larger in size and weight than the rather thin light anode slurry. Weights of slurry that have been employed in practice are, for example, about 3.75 grams for the cathode and 1.3 grams for the anode.

In other systems, such as alkaline systems which are anode dependent rather than cathode dependent, the first slurry might be the anode rather than the cathode. Another modification that might be made is to stack the subassemblies from the extruder 107 before adding the subassembly from the covering up stage 102. Other alternatives of this kind will be apparent to the artisan and need not be described in detail.

Specific anode and cathode slurry compositions for use in practicing the invention are more fully described in the above cited U.S. application Ser. No. 684,370, and in copending U.S. application for Letters Ser. No. 744,871, filed concurrently herewith by me for Laminar Batteries and assigned to the assignee of this application. Briefly, suitable compositions are given in the following examples, in percent by weight based on the total weight of composition.

EXAMPLE I

|  | Weight | | Wt. % |
|---|---|---|---|
| Methocel 4000 | 2 | gm. | 0.33 |
| ammonium chloride | 68 | gm. | 11.24 |
| zinc chloride | 30.9 | gm. | 5.11 |
| mercuric chloride | 5.9 | gm. | 0.98 |
| powdered zinc | 300 | gm. | 49.60 |
| water | 198 | ml. | 32.74 |
|  |  |  | 100.0 |

In the above formulation, Methocel 4000 is carboxymethyl cellulose, as sold by Dow Chemical Co. of Midland, Michigan.

EXAMPLE II

|  | Weight | | Wt.% |
|---|---|---|---|
| ammonium chloride | 33 | gm. | 8.66 |
| zinc chloride | 15 | gm. | 3.94 |
| mercuric chloride | 3 | gm. | 0.79 |
| poly-2-acrylamido-2-methylpropane sulfonic acid | 6 | gm. | 1.58 |
| carbon black | 25 | gm. | 6.56 |

EXAMPLE II-continued

| | Weight | | Wt.% |
|---|---|---|---|
| manganese dioxide | 200 | gm. | 52.49 |
| water | 99 | ml. | 25.98 |
| | | | 100.0 |

EXAMPLE III

| | |
|---|---|
| Zn | 60.00 |
| H$_2$O | 25.98 |
| Carboxymethyl cellulose | 0.26 |
| HgCl$_2$ | 0.78 |
| NH$_4$Cl | 8.92 |
| ZnCl$_2$ | 4.06 |
| | 100.0 |

EXAMPLE IV

| | |
|---|---|
| Zn | 50.03 |
| H$_2$O | 31.70 |
| NH$_4$Cl | 10.49 |
| HgCl$_2$ | 0.68 |
| Jaguar gum | 2.10 |
| ZnCl$_2$ | 5.00 |
| | 100.0 |

EXAMPLE V

| | |
|---|---|
| Zn | 76.4 |
| H$_2$O | 15.0 |
| NH$_4$Cl | 5.0 |
| HgCl$_2$ | 1.0 |
| ZnCl$_2$ | 2.3 |
| Carboxymethyl cellulose | 0.3 |
| | 100.0 |

EXAMPLE VI

| | |
|---|---|
| Zn | 54.40 |
| H$_2$O | 30.31 |
| ZnCl$_2$ | 4.36 |
| NH$_4$Cl | 9.36 |
| HgCl$_2$ | 0.71 |
| hydroxyethyl cellulose | 0.87 |
| | 100.0 |

EXAMPLE VII

| | |
|---|---|
| Zn | 47.1 |
| H$_2$O | 37.2 |
| ZnCl$_2$ | 3.4 |
| NH$_4$Cl | 10.7 |
| HgCl$_2$ | 0.6 |
| hydroxyethyl cellulose | 1.0 |
| | 100.0 |

EXAMPLE VIII

| | |
|---|---|
| NH$_4$Cl | 8.78 |
| ZnCl$_2$ | 3.99 |
| HgCl$_2$ | 0.80 |
| Poly-sulfonic acid | 1.60 |
| Carbon | 6.65 |
| H$_2$O | 25.00 |
| MnO$_2$ | 53.19 |
| | 100.0 |

EXAMPLE IX

| | |
|---|---|
| Carboxymethyl cellulose | 0.3 |
| Zinc | 60.0 |
| Water | 26.0 |
| HgCl$_2$ | 0.8 |
| NH$_4$Cl | 8.9 |
| ZnCl$_2$ | 4.0 |
| | 100.0 |

EXAMPLE X

| | |
|---|---|
| MnO$_2$ | 51.81 |
| Carbon black | 6.48 |
| ZnCl$_2$ | 4.35 |
| NH$_4$Cl | 9.56 |
| H$_2$O | 27.80 |
| | 100.0 |

While the invention has been described with reference to the specific details of various illustrative embodiments, many changes and variations will occur to those skilled in the art upon reading this description. Such can obviously be made without departing from the scope of the invention.

Having thus defined the invention, what is claimed is:

1. In a method of making batteries with slurry electrodes, the steps of sealing a conductive plastic intercell connector over a central opening in a thermoplastic frame, depositing a first wet electrode slurry over the intercell connector in the opening in the frame, covering the first wet slurry with a sheet of separator material, and depositing a second wet electrode slurry in registry with the first wet slurry over the opposite side of the intercell connector form the first slurry.

2. The method of making batteries with slurry electrodes comprising the steps of sealing a conductive plastic intercell connector over a central opening of a thermoplastic frame, the intercell connector being of smaller dimensions than the frame so that an exposed area of the frame surrounds the intercell connector sealed thereto, extruding a first electrode slurry over the intercell connector in the opening in the frame, covering the first slurry with a sheet of separator material, and extruding a second electrode slurry in registry with the first slurry over the opposite side of the intercell connector from the first slurry.

3. The method of making a thin flat laminar battery comprising the steps of making a first subassembly by heat sealing a first thermoplastic frame having a central opening to one side of a first thin flat thermoplastic conductive current collector having an opposite side to which a thin flat metal terminal sheet is laminated, depositing a first wet slurry electrode of a first polarity on said first collector sheet within the opening in said first frame, and applying a first separator having dimensions larger than the opening in said first frame and smaller than the outer dimensions of said first frame over and in contact with said first slurry and adjacent portions of said first frame to leave a peripheral border of said first frame exposed; making at least one second subassembly by the steps, for each second subassembly, of heat sealing a thin flat thermoplastic conductive intercell connector over a central opening in one of a series of at least one second thermoplastic frame having lateral dimensions corresponding to those of said first frame, said intercell connector having lateral dimensions larger than said opening and smaller than the external lateral dimensions of said frame so that said seal is formed outside the boundaries of said opening leaving a peripheral border of said second frame exposed, depositing a second wet slurry electrode of said first polarity on the surface of said intercell connected confronting said second frame and within the boundaries of the opening in said frame, applying a second separator having dimensions corresponding to the dimensions of said first separator over and in contact with said second slurry electrode and adjacent portions of said second frame to leave a peripheral border of said second frame exposed, and depositing a third electrode of a second polarity opposite said first polarity on said intercell connector on the side thereof opposite said second frame and in registry with said second electrode; making a third subassembly by depositing an electrode of said second polarity on a region corresponding to the openings in said frame of the surface of a second thin flat thermoplastic conductive current collector having an opposite side to which a thin flat metal terminal sheet is laminated, assembling said subassemblies in a registered linear array with electrodes of opposite polarities in contact with opposite sides of each of said separators, and heat sealing the outer peripheral portions of said frames together and to contiguous regions of said current collectors.

4. In the method of making a thin flat laminar battery, the steps of making a first subassembly by sealing a first nonconducting frame having a central opening to one side of a first thin flat thermoplastic conductive current collector, depositing a first wet slurry electrode of a first polarity on said first collector sheet within the opening in said first frame, and applying a first separator having dimensions larger than the opening in said first frame and smaller than the outer dimensions of said first frame over and in contact with said first slurry and adjacent portions of said first frame to leave a peripheral border of said first frame exposed; making at least one second subassembly by the steps, for each second subassembly, of sealing a thin flat conductive intercell connector over a central opening in one of a series of at least one second nonconducting frame having lateral dimensions corresponding to those of said first frame, said intercell connector having lateral dimensions larger than said opening and smaller than the external lateral dimensions of said frame so that said seal is formed outside the boundaries of said opening leaving a peripheral border of said second frame exposed, depositing a second wet slurry electrode of said first polarity on the surface of said intercell connector confronting said second frame and within the boundaries of the opening in said frame, applying a second separator having dimensions corresponding to the dimensions of said first separator over and in contact with said second slurry electrode and adjacent portions of said second frame to leave a peripheral border of said second frame exposed, and depositing a third electrode of a second polarity opposite said first polarity on said intercell connector on the side thereof opposite said second frame and in registry with said second electrode; making a third subassembly by depositing an electrode of said second polarity on a region corresponding to the openings in said frame of the surface of a second thin flat conductive current collector, assembling said subassemblies in a registered linear array with electrodes of opposite polarities in contact with opposite sides of each of said separators, and sealing the outer peripheral portions of said frames together and to contiguous regions of said current collector.

5. In the method of making a thin flat laminar battery, the steps of making a first subassembly by sealing a first nonconducting frame having a central opening to one side of a first thin flat conductive current collector, depositing a first wet slurry electrode of a first polarity on said first collector sheet within the opening in said first frame, applying a first separator having dimensions larger than the opening in said first frame and smaller than the outer dimensions of said first frame over and in contact with said first slurry and adjacent portions of said first frame to leave a peripheral border of said first frame exposed; and sealing the outer periphery of said first separator to said first frame; making at least one second subassembly by the steps, for each second subassembly, of heat sealing a thin flat conductive intercell connector over a central opening in one of a series of at least one second nonconducting frame having lateral dimensions corresponding to those of said first frame, said intercell connector having lateral dimensions larger than said opening and smaller than the external lateral dimensions of said frame so that said seal is formed outside the boundaries of said opening leaving a peripheral border of said second frame exposed, depositing a second wet slurry electrode of said first polarity on the surface of said intercell connector confronting said second frame and within the boundaries of the opening in said frame, applying a second separator having dimensions corresponding to the dimensions of said first separator over and in contact with said second slurry electrode and adjacent portions of said second frame to leave a peripheral border of said second frame exposed, sealing the outer periphery of said second separator to said second frame, and depositing a third electrode of a second polarity opposite said first polarity on said intercell connector on the side thereof opposite said second frame and in registry with said second electrode; making a third subassembly by depositing an electrode of said second polarity on a region corresponding to the openings in said frame of the surface of a second thin flat conductive current collector, assembling said subassemblies in a registered linear array with electrodes of opposite polarities in contact with opposite sides of each of said separators, and sealing the outer peripheral portions of said frames together and to contiguous regions of said current collector.

6. In the process of making a thin flat laminar battery, the steps of making a subassembly by heat sealing a thin flat thermoplastic conductive intercell connector over a central opening in a thermoplastic nonconducting frame, said intercell connector having lateral dimensions larger than said opening and smaller than the external lateral dimensions of said frame so that said seal is formed outside the boundaries of said opening leaving a peripheral border of said second frame exposed, depositing a wet slurry first electrode of a first polarity on the surface of said intercell connector confronting said frame and within the boundaries of the opening in said frame, applying a separator having dimensions larger than the opening in said frame and smaller than the outer dimensions of said frame over and in contact with said slurry electrode and adjacent portions of said second frame to leave a peripheral border of said second frame exposed, and depositing a second electrode of a second polarity opposite said first polarity on said intercell connector on the side thereof opposite said frame and in registry with said first electrode.

7. The method of making a thin flat laminar battery comprising the steps of making a first subassembly by heat sealing a first thermoplastic frame having a central opening to one side of a first thin flat thermoplastic conductive current collector having an opposite side to which a thin flat metal terminal sheet is laminated, extruding a first wet slurry electrode of a first polarity on said first collector sheet within the opening in said first frame, and applying a first separator having dimensions larger than the opening in said first frame and smaller than the outer dimensions of said first frame over and in contact with said first slurry and adjacent portions of said first frame to leave a peripheral border of said first frame exposed; making at least one second subassembly by the steps, for each second subassembly, of heat sealing a thin flat thermoplastic conductive intercell connector over a central opening in one of a series of at least one second thermoplastic frame having lateral dimensions corresponding to those of said first frame, said intercell connector having lateral dimensions larger than said opening and smaller than the external lateral dimensions of said frame so that said seal is formed outside the boundaries of said opening leaving a peripheral border of said second frame exposed, depositing a second wet slurry electrode of said first polarity on the surface of said intercell connector confronting said second frame and within the boundaries of the opening in said frame, applying a second separator having dimensions corresponding to the dimensions of said first separator over and in contact with said second slurry electrode and adjacent portions of said second frame to leave a peripheral border of said second frame exposed, and extruding a third wet slurry electrode of a second polarity opposite said first polarity on said intercell connector on the side thereof opposite said second frame and in registry with said second electrode; making a third subassembly by extruding a wet slurry electrode of said second polarity on a region corresponding to the openings in said frame of the surface of a second thin flat thermoplastic conductive current collector having an opposite side to which a thin flat metal terminal sheet is laminated, assembling said subassemblies in a registered linear array with electrodes of opposite polarities in contact with opposite sides of each of said separators, and heat sealing the outer peripheral portions of said frames together and to contiguous regions of said current collector.

8. In a method of making thin flat laminar batteries with wet slurry electrodes, the steps of making a plurality of intermediate subassemblies, each of said intermediate subassemblies being made by heat sealing a thin flat conductive thermoplastic intercell connector over a central opening formed in a thin flat nonconducting thermoplastic frame having peripheral regions extending beyond said intercell connector on all contiguous sides, extruding a first wet slurry electrode of a first polarity over surface of said intercell connector on the side confronting said frame and in the region defined by the opening in said frame, placing a separator over and in contact with said first wet slurry electrode and with adjacent portions of said frame within the borders of said frame to leave a continuous peripheral border of said frame exposed, and extruding a second wet slurry electrode of opposite polarity to said first electrode over the surface of said intercell connector on the side opposite said frame and in the region opposite said opening and in registry with said first electrode; stacking said subassemblies in a contiguous linear array with electrodes of opposite polarity in confronting relationship, and thermally sealing the exposed contiguous borders of said frames together.

9. In a method of making laminar batteries with wet slurry electrodes, the steps of making a plurality of intermediate subassemblies, each of said intermediate subassemblies being made by sealing a conductive intercell connector over a central opening formed in a nonconducting frame having peripheral regions extending beyond said intercell connector on all contiguous sides, extruding a first wet slurry electrode of a first polarity over the surface of said intercell connector on the side confronting said frame and in the region defined by the opening in said frame, placing a separator over and in contact with said first wet slurry electrode and with adjacent portions of said frame within the borders of said frame to leave a continuous peripheral border of said frame exposed, and extruding a second wet slurry electrode of opposite polarity to said first electrode over the surface of said intercell connector on the side opposite said frame and in the region opposite said opening and in registry with said first electrode; stacking said subassemblies in a contiguous linear array with electrodes of opposite polarity in confronting relationship, and sealing the exposed contiguous borders of said frames together.

10. In a method of making thin flat laminar batteries with wet slurry electrodes, the steps of making a plurality of intermediate subassemblies, each of said intermediate subassemblies being made by heat sealing a thin flat conductive thermoplastic intercell connector over a central opening formed in a thin flat nonconducting thermoplastic frame, said frame having peripheral regions extending beyond said intercell connector on all contiguous sides, extruding a wet slurry cathode over the surface of said intercell connector on the side confronting said frame and in the region defined by the opening in said frame, placing a separator over and in contact with said wet slurry cathode and with adjacent portions of said frame within the borders of said frame to leave a continuous peripheral border of said frame exposed, and extruding a wet slurry anode over the surface of said intercell connector on the side opposite said frame and in the region opposite said opening and in registry with said cathode; stacking said subassemblies in a contiguous linear array with electrodes of opposite polarity in confronting relationship, and thermally sealing the exposed contiguous borders of said frames together.

11. In a method of making thin flat laminar batteries with well slurry electrodes, the steps of making a plurality of intermediate subassemblies, each of said intermediate subassemblies being made by heat sealing a thin flat conductive thermoplastic intercell connector over a central opening formed in a thin flat nonconducting thermoplastic frame and having peripheral regions extending beyond said intercell connector on all sides, extruding a first wet slurry electrode of a first polarity over the surface of said intercell connector on the side confronting said frame and in the region defined by the opening in said frame, placing a separator over and in contact with said first wet slurry electrode and with adjacent portions of said frame within the borders of said frame to leave a continuous peripheral border of said frame exposed, said separator being formed with a liquid impervious thermoplastic border in the region extending beyond said opening, heat sealing said liquid impervious border to said frame, and extruding a second wet slurry electrode of opposite polarity to said first over the surface of said intercell connector on the side opposite said frame and in the region opposite said opening and in registry with said first electrode; stacking said subassemblies in a contiguous linear array with electrodes of opposite polarity in confronting relationship, and thermally sealing the exposed contiguous borders of said frames together.

* * * * *